United States Patent [19]

Southam

[11] 4,333,746

[45] Jun. 8, 1982

[54] GAS CONDITIONING MEANS FOR A PLURALITY OF BOILERS

[75] Inventor: Barry Southam, San Juan Capistrano, Calif.

[73] Assignee: Wahlco, Inc., Santa Ana, Calif.

[21] Appl. No.: 257,343

[22] Filed: Apr. 24, 1981

[51] Int. Cl.³ .............................................. B03C 3/34
[52] U.S. Cl. ......................................... 55/106; 55/5;
       55/120; 55/122; 55/134; 422/168; 431/32;
       431/121
[58] Field of Search ..................... 422/168; 55/5, 106,
       55/107, 120, 122, 134, 282, 283, 309; 431/32,
       121; 137/238; 423/532, 539

[56] References Cited

U.S. PATENT DOCUMENTS

| | | | |
|---|---|---|---|
| 3,665,676 | 5/1972 | McKewen | 55/106 X |
| 3,686,825 | 8/1972 | Busby | 55/5 |
| 3,704,569 | 12/1972 | Hardison et al. | 55/5 X |
| 3,722,178 | 3/1973 | Aaland et al. | 55/5 X |
| 3,993,429 | 11/1976 | Archer | 55/5 X |
| 4,070,424 | 1/1978 | Olson et al. | 55/5 X |
| 4,179,071 | 12/1979 | Kozacka | 264/262 X |

*Primary Examiner*—Richard L. Chiesa
*Attorney, Agent, or Firm*—Howard E. Sandler

[57] ABSTRACT

A gas conditioning means for a plurality of boilers and more particularly an improved means for providing a conditioning mixture of sulfur trioxide ($SO_3$), from a single system, for injection into the flue gas streams of a plurality of boilers for the conditioning thereof.

10 Claims, 1 Drawing Figure

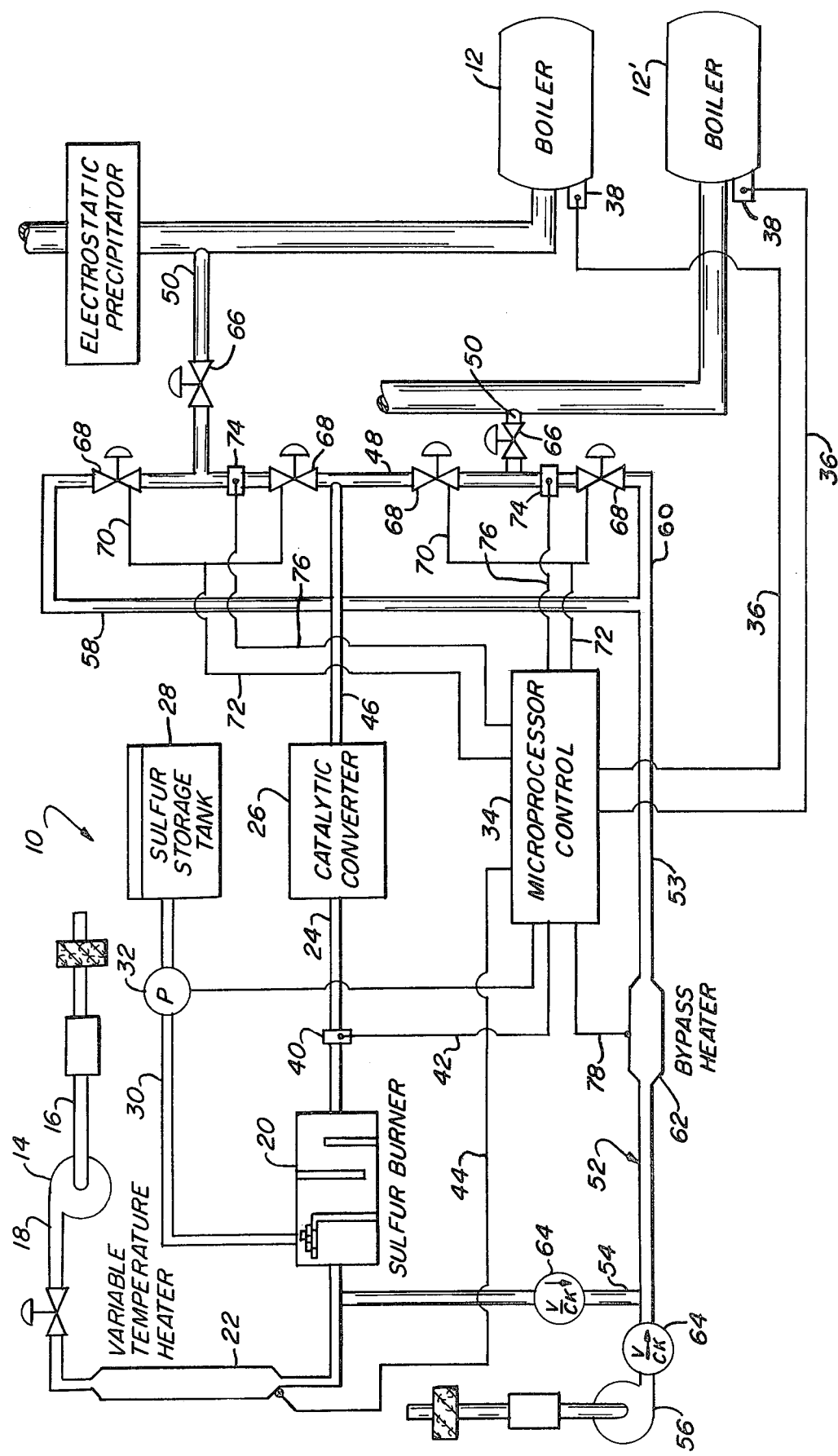

GAS CONDITIONING MEANS FOR A PLURALITY OF BOILERS

A common system for removing fly ash from the flue gases of fossil fuel combustion, for example coal, is by means of electrostatic precipitators. However, when coal with a sulfur content of less than 1% is burned in a boiler, the naturally formed sulfur trioxide ($SO_3$) is seldom sufficient to reduce the resistivity of the fly ash to a level at which an electrostatic precipitator can function efficiently (approximately $5 \times 10^{10}$ ohm-cm).

As further amplification of the above, substantially the entire sulfur content of coal, which may vary from less than 1% to approximately 6%, oxidizes to sulfur dioxide ($SO_2$) during combustion of the coal, and from 1% to 5% of such sulfur dioxide further oxidizes to sulfur trioxide. Typically, as the flue gases cool after combustion, the sulfur trioxide component thereof combines with entrained moisture to form sulfuric acid ($H_2SO_4$) which condenses on the fly ash particulate. The sulfuric acid which condenses on the fly ash particulate generally dictates the electrical resistivity of such particulate. Thus, in instances where low sulfur coal is burned in the boiler, only relatively small quantities of sulfuric acid are generated and, hence, the electrical resistivity of the fly ash is relatively high. Accordingly, when burning low sulfur coal, collecting efficiency of the electrostatic precipitators may be degraded considerably, particularly in instances where the precipitator is designed to receive flue gases at temperatures corresponding generally to normal stack exit temperatures (i.e., 250° F. to 320° F.).

Alternative systems have been developed in attempts to rectify the problems of high resistivity fly ash removal by electrostatic precipitators. Examples of such alternative systems have included utilizing: hot-side precipitators; enlarged cold-sided precipitators; bag houses; or flue gas conditioning. In many instances experience has shown that the use of flue gas conditioning is the most satisfactory solution in terms of reliability, efficiency, cost, space requirements and versatility.

In those instances of flue gas conditioning systems, the gas conditioning means and method of the type illustrated in U.S. Pat. No. 3,993,429 has proved to be an overwhelming success. In these and other systems, a controlled trace amount of sulfur trioxide is injected into the flue gas stream intermediate the boiler and the electrostatic precipitator to thus bring the surface resistivity of the fly ash into the desired range for efficient removal thereof by the precipitator.

Experience has illustrated that a variety of operating parameters are important in the proper functioning of the flue gas conditioning system of the type illustrated in U.S. Pat. No. 3,993,429. Among such features which are germane to the instant invention are the following:

1. The sulfur trioxide gas must be maintained at a temperature above the dew point thereof, approximately 500° F., from the point of conversion to the point of injection as a chemical reactant. Should the gas temperature drop substantially below 500° F. before discharge, condensation and the resultant formation of sulfuric acid will occur prior to discharge which in turn may result in a variety of deleterious effects, for example: corrosion, undesirable chemical reactions, process breakdown, and the like.

2. Appropriate purging and shutdown techniques must be maintained in the event of outages or system shutdown to avoid condensation of the remaining system gases as well as the backflow of sulfur trioxide (in the event of a positive system) with resultant deleterious effects and potential health hazards.

3. System volume, flow and pressure parameters must be constantly maintained.

Many modern commercial or development systems of the type illustrated in U.S. Pat. No. 3,993,429 have adopted measures to meet the operating parameters indicated above; however, generally the prior successful installations of sulfur trioxide injection flue gas conditioning systems have been on a one-to-one basis or, more specifically, a single system to treat the flue gas from a single boiler.

In instances where the peak demand permits; cost, operating efficiency, maintenance and space considerations, may dictate a preference of utilizing a single system to condition the stack gas from a plurality of boilers. Nevertheless, heretofore, no successful installation of multi-stack conditioning sulfur trioxide systems has been developed which will successfully fulfill the above-described operating parameters (as well as additional parameters which become apparent in plural operations; such as, proportioning proper injection of conditioning mixture, appropriate by-pass arrangements, and the like) in a safe, efficient and appropriate manner.

By means of the present invention which comprises a single sulfur trioxide flue gas conditioning system for conditioning the gas of a plurality of boilers and which includes appropriate controls, valving and by-pass arrangements, the hereinabove mentioned operating parameters are achieved. Furthermore, the problems of adapting the concepts of the single system—single boiler arrangements of the type illustrated in the aforementioned Patent are overcome or, in the least, greatly alleviated.

Accordingly, it is one primary object of the present invention to provide a single source gas conditioning system for a plurality of boilers.

It is another object of this invention to provide such a system which includes appropriate means to provide purging or shutdown conditions of the system portion which feeds one stack while simultaneously providing one or more other stacks with the appropriate conditioning mixture.

It is yet another object of this invention to provide selectively operable means to maintain all or any portion of the system at an appropriate temperature and/or pressure to prevent deleterious effects from the sulfur trioxide gas therein.

These and other objects and advantages of the present invention will become more readily apparent upon a reading of the following description and drawings in which the sole drawing is a schematic illustration of a flue gas conditioning system which is constructed and is operative in accordance with the principles of the present invention:

In the FIGURE, there is generally indicated at 10, a flue gas conditioning system which is constructed and is operative in accordance with the principles of the present invention. Those skilled in the art will appreciate that in general a flue gas conditioning system comprises a highly complex system which is ordinarily adapted for, but not necessarily limited to, sulfur trioxide conditioning of fly ash particulates which are entrained in flue gas streams which emerge from fossil fuel, primarily coal, burning boilers. The sulfur trioxide conditioning is completed prior to the flue gas stream entering an electrostatic precipitator and, hence, enhances removal of the fly ash by the electrostatic precipitator by conventional electrostatic precipitation techniques. For purposes of the description herein, the embodiment described is directed to sulfur trioxide conditioning of a gas stream emerging from coal burning boilers; however, this specific descriptive embodiment is not intended to unduly limit the scope of the invention herein.

The flue gas conditioning system 10 of the present invention is structured and operative to provide a sulfur trioxide conditioning mixture from a single system 10 to selectively treat the flue gas streams of a plurality of boilers, shown as two boilers 12 and 12'. System 10 comprises, in part: an air intake fan 14, preferably a constant speed fan, the inlet of which communicates with ambient air via an inlet conduit 16; a conduit 18 which communicates between the fan 14 and a sulfur burner 20; a variable temperature primary heater 22 which is disposed within conduit 18; and, as shown, a conduit 24 which communicates between the sulfur burner 20 and a catalytic converter 26. It is to be noted that in practice, converter 26 may be combined in a unitary staged assembly; however, for purposes of clarity, the schematic drawing includes a conduit 24.

The system 10 additionally includes a liquid sulfur storage tank 28 which is in communication with the sulfur burner 20 via conduit 30. A proportional pump 32 is disposed within conduit 30 to assist in the delivery of liquid sulfur from tank 28 via conduit 30 into the burner 20. A suitable controller, such as the schematically illustrated microprocessor control 34, receives boiler load signals, via electrical lines 36, from boiler sensors 38, to selectively regulate the delivery of liquid sulfur to the burner 20. To assist in this regulation, the microprocessor control 34, is suitably programmed to control the sulfur flow in proportion to the known percentage of sulfur content of the coal being burned.

The portion of the system 10 which is described hereinabove is generally well known in the art and is fully described in U.S. Pat. No. 3,993,429. Broadly, such portion is operative by energizing fan 14 to provide ambient air to the conduit 18 whereat, during start-up of burner 20, the air is heated to a temperature of approximately 800° to 850° F. The hot air is then directed to the sulfur burner 20 to heat up the interior thereof to thereby result in the ignition of the liquid sulfur being delivered to burner 20 by the pump 32. The ignited sulfur rapidly oxidizes to form a sulfur dioxide and air mixture containing, for example, 5% sulfur dioxide by volume. This sulfur dioxide—air mixture then passes to the catalytic converter 26 for the production of sulfur trioxide for subsequent injection into the boiler flue gas streams for the conditioning thereof. The specific means for injection of the sulfur trioxide into the boiler flue gas streams may be any suitable arrangement; for example, the industrial sulfur trioxide gas injection probe which is fully illustrated and described in U.S. Pat. No. 4,179,071.

The system 10 additionally includes a sensor 40 adjacent the outlet side of the burner 20. Sensor 40 detects the temperature of the burner outlet mixture and sends this signal via electrical line 42 to the microprocessor control 34. Control 34 is suitably programmed to respond to the signal from sensor 40 to send the signal via electrical line 44 to the primary heater 22 for the selective modulation thereof to thus regulate the output temperature of the gas stream from the burner 20 to the optimum temperature for efficient operation of the catalytic converter 26.

Inasmuch as the invention herein is primarily directed to the apparatus and method for adapting a known portion of a system such as is described hereinabove for the simultaneous and selective sulfur trioxide conditioning of a plurality of boilers, further description of such known portions is not necessary for one skilled in the art to achieve a full understanding of the invention herein. Accordingly, for a further description of the elements described hereinabove and the operation and interaction thereof, reference is hereby specifically made to U.S. Pat. Nos. 3,993,429 and 4,179,071.

The sulfur trioxide—air mixture emerging from the catalytic converter 26 passes through a conduit 46 and thence to a valved control conduit 48 wherefrom the sulfur trioxide—air mixture is in selective communication with individual direct supply conduits 50 which communicate at spaced locations between conduit 48 and respective ones of the boilers 12 and 12'.

System 10 additionally comprises a hot air by-pass sub-system 52 comprising a take-off conduit 54 which communicates between conduit 18 (intermediate the primary heater 22 and the sulfur burner 20) and a by-pass conduit 53. As will be described hereinafter, the by-pass sub-system 52, in conjunction with the valved control conduit 48, provides a means and a method for the simultaneous or selective conditioning of boilers 12 and 12' from the single flue gas conditioning system 10.

A by-pass air intake fan 56 communicates between ambient air and an inlet end of the by-pass conduit 53. The other end of conduit 53 is bifurcated at the juncture of by-pass conduit portions 58 and 60. Conduit portions 58 and 60 each communicate with a respective axial end portion of the valved control conduit 48. A by-pass heater 62 is disposed in conduit 53 intermediate the fan 56 and the bifurcated end thereof. Suitable one-way check valves 64 are disposed in conduits 53 and 54 to prevent respective upstream or reverse flows of air therein.

A plurality of variable control dampers or valves 68 are disposed within the control conduit 48 for complete selective operation of the system 10, for example:

1. The exhaust gases from one of the boilers 12 and 12' may be conditioned while the other boiler is shut down or the portion of the system 10 communicating therewith is being purged.

2. The exhaust gases from both boilers 12 and 12' may simultaneously be conditioned in equal or unequal amounts.

3. Purging, because of shutdown or outages with respect to both boilers 12 and 12', may be simultaneously completed on all involved portions of the system 10.

As illustrated, four valves 68 are disposed in the valved conduit 48 as follows: a valve 68 intermediate each respective end of conduit 48 and the adjacent direct supply conduits 50; and a valve 68 intermediate each respective direct supply conduit 50 and the juncture of the conduit 46 with the valved conduit 48. Each pair of valves 66 on respective sides of the juncture of conduits 46 and 48 are appropriately electrically coupled, for example such as by electrical line 70, to be operative in a manner that when one of the valves 68 is open, the other valve 66 of the pair is closed. Signals for operational sequencing of the valves 68 are given by the microprocessor control 34 which communicates with valves 68 in any suitable manner, for example, via electrical lines 72. It is noted that lines 72 may additionally carry signals to the valves 68 most closely adjacent to the juncture of the conduits 46 and 48 for the control of the proportional opening of the valve openings thereof to thus selectively control the volume of the gas conditioning mixture being directed to the exhaust ducts of the boilers 12 and 12'.

System 10 additionally includes sensors 74, intermediate each of the above-mentioned coupled pairs of valves 68, to determine the temperature of the gases in the conduit 48 at these locations. The temperature signals from sensors 74 are fed to the microprocessor control 34 by electrical lines 76. In response to the assimilation of such signals; the microprocessor control 34 can thus direct appropriate modulation, start-up or shutdown of the heaters 22 and 62 via the aforementioned electrical line 44 and an additional electrical line 78 which communicates between the control 34 and the by-pass heater 62.

With a configuration as described above, the system 10 is operative in the following manner:

1. When conditioning mixture is required for both boilers 12 and 12':
    a. The by-pass fan 56 and the by-pass heater 62 are not energized.
    b. The valves 68 adjacent the ends of the control conduit 48 are closed and the valves 68 adjacent the juncture of the conduits 46 and 48 are open.
    c. The system 10 generally operates in much the same manner as described with respect to FIG. 2 in the aforementioned U.S. Pat. No. 3,993,429 except that the flue gas from a plurality of boilers is conditioned simultaneously by a single conditioning system. Furthermore, in the event that one of the boilers 12 and 12' require a different conditioning mixture for the flue gas thereof from the other boiler, the respective valves 68 adjacent the juncture of conduits 46 and 48 may be selectively and independently adjusted via an appropriate signal from the microprocessor control 34.
2. When conditioning mixture is required for only one boiler 12 and 12':
    a. In the event that no purging is required (i.e., the boiler has been down for some time or, is operative, and has not required conditioning for some time) then the operation of the system 10 is essentially as described above in condition 1 with the exception that the valve 68, intermediate the juncture of conduits 46 and 48, and the conduit 50 leading to the non-conditioned burner, will be closed. Furthermore, in the event that the system 10 is a positive system, either: the by-pass fan 56 would have to be energized to prevent backflow of potentially deleterious flue gases from the non-conditioned boiler to the system 10; or suitable one-way check valves (none shown for purposes of clarity) may be disposed within the conduit 48 intermediate each valve 68 and the respectively adjacent conduit 50.
    b. In the event that purging is required (i.e., to clear the system portion of sulfur trioxide and other potentially deleterious gases) and, for example, boiler 12 does not require conditioning, the valve 68 adjacent conduit portion 58 is open and, hence, the other valve 68 coupled thereto is closed. With such a sequencing, conditioned heated air will flow from the heater 22, through lines 54, 53 and 58, thence through a portion of line 54, then through the respective line 50 and then through the probe (not shown) and into the duct of the boiler. If the system 10 is a positive system then, if the air flow provided by the primary fan 14 is not sufficient, the microprocessor will send an appropriate signal for the energization of the by-pass fan 56. Thus, the purging cycle of perhaps 30 minutes, will maintain the inoperative portion of the system 10 at an appropriate temperature above the dew point of sulfur trioxide (i.e., 500° to 550° F.) to prevent the formation of sulfuric acid and the resultant deleterious effects (i.e., safety and health hazards, converter and fan damage, clogging of the probe injection nozzles and the like). The respective sensor 74 will constantly detect the temperature of the purging air at the appropriate location and, if sensor 74 emits a signal indicating that the temperature of the purging flow is falling below the dew point of sulfur trioxide, the microprocessor control 34 will cause the by-pass heater 62 to be energized and operative at a sufficient temperature to supplement the heater 22 and thus maintain the appropriate temperature.
    c. Subsequent to purging, the system 10 will switch from the condition 2(b) above to that of condition 2(a).
3. When there is an outage or sudden shutdown of all the boilers:
    a. In the event of an outage, an auxiliary generator (not shown) will energize the by-pass system 52. Thus, the by-pass fan 56 and by-pass heater 62 will be immediately energized, and the valves 68 will be appropriately sequenced so that the entire by-pass system 52, both conduits 50 and the respective probes therefor will be purged generally in the manner indicated in condition 2 above.
    b. In the event of a shutdown of all boilers without an outage, the sequencing of the system 10 will be essentially as described in condition 2 above except that both coupled pairs of valves 68 will be sequenced to permit a purging flow to both boilers 12 and 12'.

The embodiment described herein is a presently preferred embodiment of a sulfur trioxide gas conditioning system constructed in accordance with the principles of the present invention; however, it is to be understood that various modifications may be made to the embodiment described herein by those knowledgeable in the art without departing from the scope of the invention as is defined by the claims set forth hereinafter. For example: manual, emergency and/or back-up valves may be inserted within the conduits where desired (i.e., variable control dampers or valves 66 disposed in conduits 50); the precepts of the invention may be equally applicable to other types of sulfur trioxide injection systems which utilize an air heater and a catalytic converter; with appropriate stand-by and valving arrangements, the by-pass heater 62 and the by-pass fan 56 may be dispensed with in view of utilizing heater 22 and fan 14 in a dual capacity; more or less operating signals may be fed to the microprocessor control 34 (i.e., sensors 38 may be omitted in favor of a manual batch input); and the like.

I claim:

1. In a sulfur trioxide conditioning system which includes heater means for heating air and means for conditioning a first flow of air, which has been heated by a first section of said heater means, to produce a sulfur dioxide conditioning mixture which is thereafter passed through a catalytic converter to produce a sulfur trioxide conditioning mixture, the improvement comprising: a plurality of independent injection portions, each of which communicates with a respective one of a plurality of independent boiler flue gas streams; directing means for selectively directing such sulfur trioxide conditioning mixture through said injection portions; purging means for selectively directing an unconditioned purge flow of air, which has been heated by said heater means, through respective ones of said independent injection portions for the purging thereof for a predetermined period after such sulfur trioxide conditioning mixture is no longer being directed therethrough; means for maintaining said purge flow of air at a temperature above the dew point of sulfur trioxide during substantially the entire purge period.

2. A sulfur trioxide conditioning system as specified in claim 1 additionally including conduit means communicating with such a first flow of air in a manner that at least a portion of such a first flow of air is such a purging flow of air, during at least a portion of the normal operation of such a system.

3. A sulfur trioxide conditioning system as specified in claim 2 wherein said heater means includes a second heater section, which is independent of said first heater section, and said means for maintaining includes, at least in part, said second heater section.

4. A sulfur trioxide conditioning system as specified in claim 1 wherein said heater means includes a second heater section, which is independent of said first heater section, and said means for maintaining includes, at least in part, said second heater section.

5. A sulfur trioxide conditioning system as is specified in claim 4 including: sensor means operative to detect the temperature of such a purge flow of air adjacent said injection portions; and controlling means which, in response to said sensor means, selectively energize said second heater section.

6. A sulfur trioxide conditioning system as is specified in claim 5 wherein the temperature generated by said heater means is variable.

7. A sulfur trioxide conditioning system as is specified in claim 1 additionally including means to maintain a positive pressure in such a system during the operation thereof.

8. A sulfur trioxide conditioning system as is specified in claim 1 wherein said directing means is operable to selectively and respectively direct differing proportions of such conditioning mixture to said injection portions.

9. A sulfur trioxide conditioning system as is specified in claim 1 wherein said directing and purging means are operable in a manner that, at least during the purging period, when such purge flow of air is directed to respective ones of said independent injection portions, the flow of such sulfur trioxide conditioning mixture thereto is discontinued.

10. A sulfur trioxide conditioning system as is specified in claim 1 additionally including a microprocessor control means and said directing means, said purging means and said means for maintaining the purge flow are all selectively controlled from said microprocessor control.

* * * * *